UNITED STATES PATENT OFFICE.

REGINALD A. FESSENDEN, OF ROSEVILLE, NEW JERSEY.

LEADING-IN WIRE FOR INCANDESCENT ELECTRIC LAMPS.

SPECIFICATION forming part of Letters Patent No. 452,494, dated May 19, 1891.

Application filed February 18, 1891. Serial No. 381,952. (No model.)

*To all whom it may concern:*

Be it known that I, REGINALD A. FESSENDEN, a citizen of Canada, residing at Roseville, in the county of Essex and State of New Jersey, have invented a new and useful Improvement in Leading-In Wires for Incandescent Electric Lamps, of which the following is a specification.

It is well known that the leading-in wires of electric incandescent lamps should have the same or nearly the same coefficient of expansion and contraction as the glass into which they are sealed, because otherwise the glass on cooling, after being sealed to the wires, would separate therefrom and an opening be made which would permit air to enter the bulb and destroy the carbon conductor. For this reason platinum has been universally used for this purpose, other well-known metals suitable for use as electrical conductors—such as silver and copper—having too great a coefficient of expansion or melting at too low a temperature for this particular use. The coefficient of expansion of glass is 91 while that of platinum is 98.

I have discovered that silicon, which is an electrical conductor of about the same specific conductivity as platinum, but with a coefficient of expansion and contraction of only 78, can be alloyed with other metals, which will improve or at least not injure its conducting power, so as to give an alloy having the same rate of expansion and contraction as glass. Thus, for example, iron having an expansion of 105 can be alloyed with silicon to produce an alloy having an expansion of 91, or the same as glass. Silicon may also be alloyed for this purpose with other metals besides iron, such as nickel, cobalt, manganese, silver, and gold, or with a combination of two or more of them, all of them having a higher rate of expansion than glass. The wires or conductors so made may be sealed into the lamp-bulb in any suitable way.

A great advantage of my improvement is that I effect a considerable saving in the manufacture of incandescent lamps, because the silicon wire is very much cheaper than platinum. Moreover, it can be made to be uniform with glass in the rate of expansion and contraction.

I claim my improved conductor for sealing in glass, broadly, whether in incandescent lamps, Geisler tubes, or other articles. The alloy should have practically the same coefficient of expansion and contraction as glass, and by "practically" I mean such as will enable it to be used in incandescent lamps, so far as expansion and contraction are concerned, with useful results.

What I claim as my invention is—

A leading-in conductor for sealing in glass, consisting of silicon alloyed with a metal having a higher coefficient of expansion and contraction than glass, substantially as described.

In testimony whereof I, the said REGINALD A. FESSENDEN, have hereunto set my hand this 14th day of February, A. D. 1891.

REGINALD A. FESSENDEN.

Witnesses:
THOMAS B. KERR,
EDWIN HOPKINSON.